United States Patent [19]

Meade

[11] 4,081,208
[45] Mar. 28, 1978

[54] OPTICAL AND ELECTRICAL CONDUIT TERMINATION MEANS FOR CIRCUIT BOARD

[75] Inventor: Robert A. Meade, Warren, Ohio

[73] Assignee: General Motors Corporation, Detroit, Mich.

[21] Appl. No.: 759,719

[22] Filed: Jan. 17, 1977

[51] Int. Cl.² .............................................. G02B 5/16
[52] U.S. Cl. .......................... 350/96.20; 339/125 R; 339/177 R; 350/96.23
[58] Field of Search ................. 350/96 C, 96 B, 96 R; 339/97 R, 97 C, 177 R, 125 L, 125 R

[56] References Cited

U.S. PATENT DOCUMENTS

| 3,510,641 | 5/1970 | Reynolds | 350/96 C |
|---|---|---|---|
| 3,569,933 | 3/1971 | Longenecker et al. | 350/96 C |
| 3,572,891 | 3/1971 | Longenecker et al. | 350/96 C |
| 3,637,284 | 1/1972 | Plyler | 350/96 C |
| 3,879,103 | 4/1975 | Peltola et al. | 339/177 R |

*Primary Examiner*—John K. Corbin
*Assistant Examiner*—Stewart Levy
*Attorney, Agent, or Firm*—Robert M. Sigler

[57] ABSTRACT

The end of an optic signal conduit has a generally cylindrical, electrically conducting ferrule, which also engages the end of an electric power conduit. A circuit board contains electrical circuitry to be powered from said electric power conduit and optic signal receiving means for controlling said circuitry. An electrically conducting, hollow, generally tubular receptor on the circuit board has an integral extending tab for connection to the board and to the electrical apparatus thereon and receives the ferrule axially therein, in physical and electrical contact therewith and in alignment with the optic signal receiving means.

1 Claim, 3 Drawing Figures

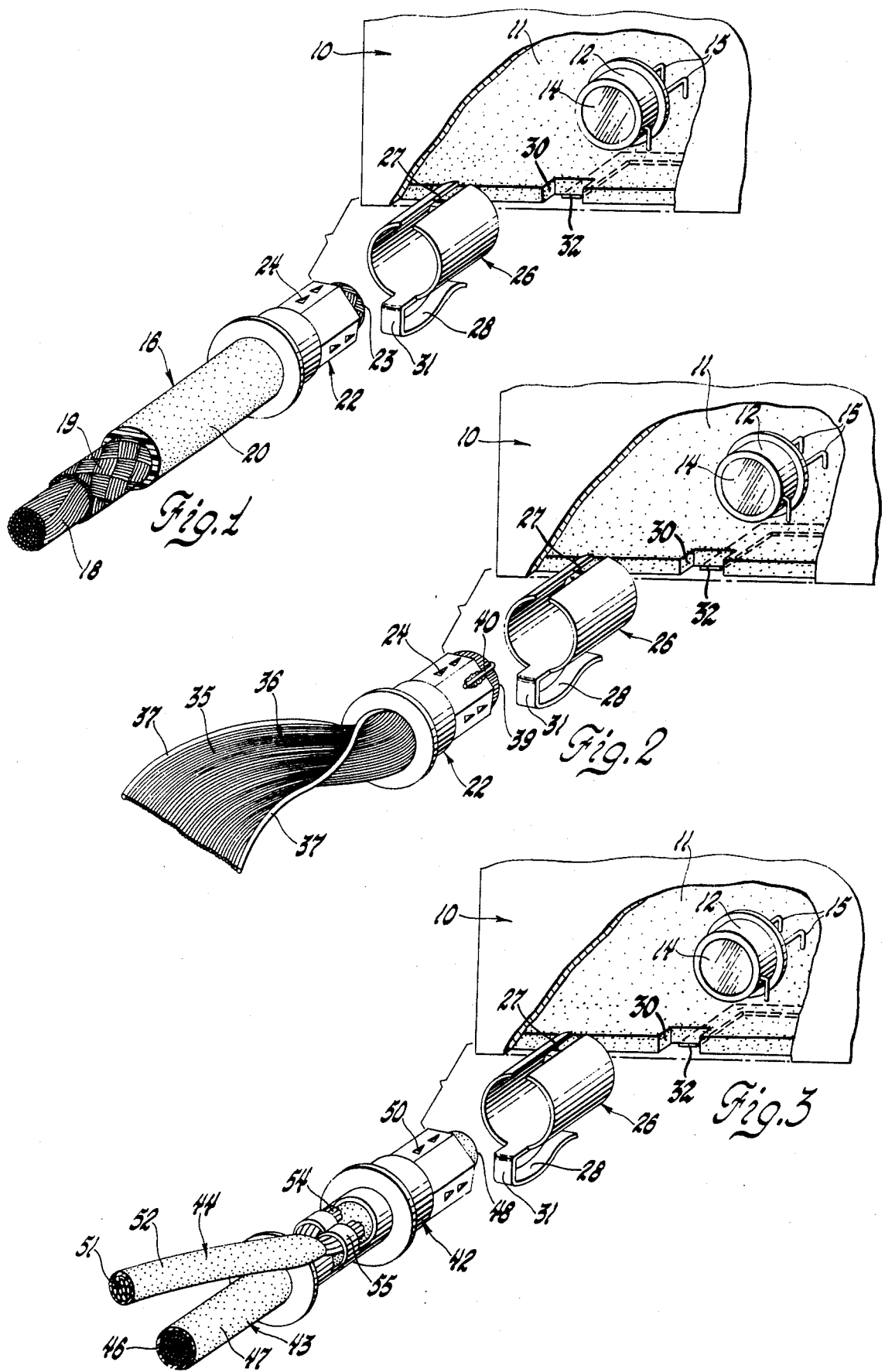

OPTICAL AND ELECTRICAL CONDUIT TERMINATION MEANS FOR CIRCUIT BOARD

BACKGROUND OF THE INVENTION

With the increasing amount of electrical apparatus and numbers of accessories on motor vehicles, it has been suggested that the maze of wires and wiring harnesses necessary to power and control said apparatus and accessories be replaced by a two-wire multiplexing system. In such a system, a single wire is adapted to carry operating power to all accessories, and a second wire is adapted to carry a multiplexed code signal from a source actuated by the vehicle operator to switches at each of the accessories. Each accessory switch would respond to a different code to actuate or deactivate the accessory.

In order to decrease the possibility of inadvertent actuation of accessories by radio frequency noise generated in the vehicle ignition system or by outside sources, the second or signal conduit would carry an optic signal, which is unaffected by radio frequency waves, rather than an electric signal. With such an approach, there is need for an inexpensive and convenient method of terminating electric and optic conduits at a circuit board.

SUMMARY OF THE INVENTION

This invention relates to means for terminating electric and optic conduits at electric circuit boards in vehicle mounted optic multiplexing systems. The means comprise a terminating, electrically conducting ferrule on the optic conduit which also engages the electric conduit and a tubular, electrically conducting receptor mounted on the circuit board in electrical contact with the electrical apparatus thereon and in alignment with the optic signal receiving apparatus. With the ferrule inserted axially in the tubular receptor, electric contact is made therethrough between the electric power conduits and electrical apparatus; and optic contact is made between the end of the optic conduits and the optic signal receiving apparatus. The tubular receptor may take the form of a split tube with an integral bent-over tab for simultaneously holding the tube in proper relationship on the board and contacting an electric contact on the underside of the board.

Further details and advantages of this invention will be apparent from the accompanying drawings and following description of the preferred embodiment.

SUMMARY OF THE DRAWINGS

FIG. 1 shows an embodiment of the invention for use with a coaxial electric and fiber optic conduit.

FIG. 2 shows an embodiment of the invention for use with ribbon-shaped electric and fiber optic conduit.

FIG. 3 shows an embodiment of the invention for use with separate electric and fiber optic conduits.

DESCRIPTION OF THE PREFERRED EMBODIMENT

Referring to FIG. 1, a vehicle mounted accessory 10 includes a circuit board 11 which has mounted thereon optic signal apparatus 12 in the form of an optic-to-electric signal converter or optically actuated switch. Optic signal apparatus 12 has a receptor surface 14 adapted to receive optic signals and electric leads 15 by which it communicates with the rest of the elements on circuit board 11.

A cable 16 comprises a core of optic fibers 18 and a braided sheath 19 of electric conduit surrounded by insulation 20. A generally cylindrical ferrule 22 is fitted over the end 23 of cable 16, which has been stripped of its insulation to expose the braided sheath 19. Ferrule 22 is provided with a plurality of inward bending tangs 24, which are pushed inward after ferrule 22 is installed on cable 16 to hold it in place and provide electric contact between ferrule 22 and electric power conduit 19. In some embodiments, if insulation 20 is sufficiently thin, it may not be necessary to strip it from the end 23 of cable 16, since it may be pierced by tangs 24.

A tubular receptor 26, stamped and formed from electrically conducting metal such as steel, has an axial slit 27 to allow expansion and an integral extending tab 28 bent backwards along receptor 26 to form a clip to hold receptor 26 on circuit board 11. The diameter of tubular receptor 26 provides a tight, gripping fit on ferrule 22 and a similarly tight gripping fit on optic signal element 12. A locating notch 30 is provided in the edge of circuit board 11 to receive the bent portion 31 of tab 28. Notch 30 and optic signal element 12, anchor receptor 26 in a specific location and alignment on circuit board 11. A conducting ribbon 32 on the underside of circuit board 11 is brought to notch 30 for electric contact with tab 28.

With receptor 26 in place on circuit board 11 and ferrule 22 inserted in receptor 26, the end 23 of cable 16 with optic signal conduit 18 is aligned with the receptor surface 14 of optic signal apparatus 12 for optic communication therebetween. In addition, electric contact is achieved between electric power conduit 19 and circuit board 11 by means of tangs 24, ferrule 22, receptor 26, tab 28 and conducting ribbon 32.

FIG. 2 shows an embodiment of the invention in which all elements of the circuit board 11, receptor 26 and ferrule 22 are identical to those in FIG. 1 but are used to terminate a different optic and electric conduit. The conduit in this embodiment comprises a plurality of optic fibers 35 joined in a flat ribbon 36 with insulated electric power wires 37 on the opposite side thereof. At the end of ribbon 36, the optic fibers 35 are cut shorter than electric wires 37; and the end 39 is rolled into a tubular shape and inserted into ferrule 22. Tangs 24 are bent into optic fibers 35 to retain ferrule 22 thereon and the ends 40 of wires 37 are stripped of insulation and bent backward. Ends 40 of wires 37 may be confined on the inside of ferrule 22 or, alternatively, bent over the outside of ferrule 22 for confinement between ferrule 22 and receptor 26. In either case, an electric current path is eatablished between wires 37 and conducting ribbon 32 while the ends of optic fibers 35 are aligned with receptor surface 14 of optic signal element 12.

In the embodiment of FIG. 3, the elements of circuit board 11 and receptor 26 are identical with those of FIGS. 1 and 2; but a modified cylindrical ferrule 42 is used to terminate separate optic conduit 43 and electric conduit 44. Optic conduit 43 comprises a plurality of optic fibers 46 in a sheath 47 and has an end 48 extending into ferrule 42. Ferrule 42 has a plurality of tangs 50 which are bent inward to retain the end 48 of conduit 43.

Electric conduit 44 comprises a plurality of electrically conducting wires 51 in an insulating sheath 52, the end 54 of which sheath is stripped from wires 51 to allow electric connection and retention thereof by crimped-over tangs 55 in ferrule 42. Electric and optic connection is made through receptor 26 to circuit board 11 in the same way as in the embodiments of FIGS. 1 and 2.

The embodiments described above are preferred embodiments of this invention, but not the only possible embodiments that will occur to those skilled in the art. Therefore the invention should be limited only by the claim which follows.

I claim:

1. Apparatus for use in a vehicle mounted optic multiplexing system to terminate an electric power conduit and an optic signal conduit at a circuit board containing electrical and optic apparatus adapted to receive electric power and optic signals, respectively, from said electric power and optic signal conduits, said apparatus comprising, in combination:

a generally cylindrical, electrically conducting ferrule on the end of the optic signal conduit, the ferrule having means engaging, in electrical contact, the electric power conduit;

an electrically conducting, hollow, generally tubular receptor on the circuit board, said receptor having an integral extending tab bent backward along the receptor as a clip for connection to the board and to the electrical apparatus thereon, the receptor being adapted to receive the ferrule axially therein, in electrical communication therewith, and to thus retain the ferrule in alignment with said optic apparatus, whereby electric power and optic signals are supplied from the electric power conduit and the optic signal conduit, respectively, to the electrical and optic apparatus on said circuit board.

* * * * *